US006822166B2

(12) United States Patent
James et al.

(10) Patent No.: US 6,822,166 B2
(45) Date of Patent: Nov. 23, 2004

(54) LOW-PROFILE PROTECTIVE SHEATH WITH CORRUGATIONS AND A HINGE AND APPARATUS AND METHOD OF MANUFACTURE THEREFOR

(75) Inventors: Benjamin B. James, Birchrunville, PA (US); Francis B. Fatato, Exton, PA (US); Matthew P. Frederick, West Chester, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/160,496

(22) Filed: May 31, 2002

(65) Prior Publication Data

US 2003/0221858 A1 Dec. 4, 2003

(51) Int. Cl.[7] .............................................. H02G 15/08
(52) U.S. Cl. ....................................................... 174/93
(58) Field of Search ................................ 174/74 A, 93, 174/117 F, 92, 102 D; 138/121, 94.5, 166

(56) References Cited

U.S. PATENT DOCUMENTS

| | | | |
|---|---|---|---|
| 3,582,532 A | 6/1971 | Plummer | 174/36 |
| 4,228,824 A | 10/1980 | Evans et al. | 138/119 |
| 4,281,211 A | 7/1981 | Tatum et al. | 174/36 |
| 4,409,427 A | 10/1983 | Plummer, III | 174/36 |
| 4,461,076 A | 7/1984 | Plummer, III | 29/825 |
| 4,478,661 A | 10/1984 | Lewis | 156/92 |
| 4,513,787 A * | 4/1985 | Hegler et al. | 138/166 |
| 4,862,922 A | 9/1989 | Kite, III | 138/119 |
| 4,939,819 A | 7/1990 | Moyer | 24/16 R |
| 5,080,529 A | 1/1992 | Watanabe et al. | 405/63 |
| 5,178,923 A | 1/1993 | Andrieu et al. | 428/36.1 |
| 5,967,194 A | 10/1999 | Martin | 138/156 |
| 6,078,009 A * | 6/2000 | Kawamura | 174/102 R |
| 6,137,055 A * | 10/2000 | Kawamura | 174/68.3 |
| 6,256,938 B1 | 7/2001 | Daton-Lovett | 52/108 |
| 6,364,575 B1 * | 4/2002 | Bradley et al. | 405/216 |

\* cited by examiner

Primary Examiner—Chau N. Nguyen
(74) Attorney, Agent, or Firm—Synnestvedt & Lechner LLP

(57) ABSTRACT

A low-profile sheath for protecting elongated items is disclosed having a pair of substrates formed from flexible sheet material with opposite edges paired together to position the substrates in overlapping alignment. One pair of edges is flexibly attached together by a hinge allowing the substrates to pivot between an open and a closed position for receiving and capturing the items. The substrates are corrugated. The hinge is formed from a plurality of thinned sheet regions which alternate between being oriented in the plane of the sheet and perpendicular to it. The alternating orientation reduces the imbalance of shear stiffness between the hinge connected edges and the free edges of the substrates. An apparatus for forming the sheath having intermeshing gears with beveled teeth and facing edge surfaces is also disclosed.

14 Claims, 16 Drawing Sheets

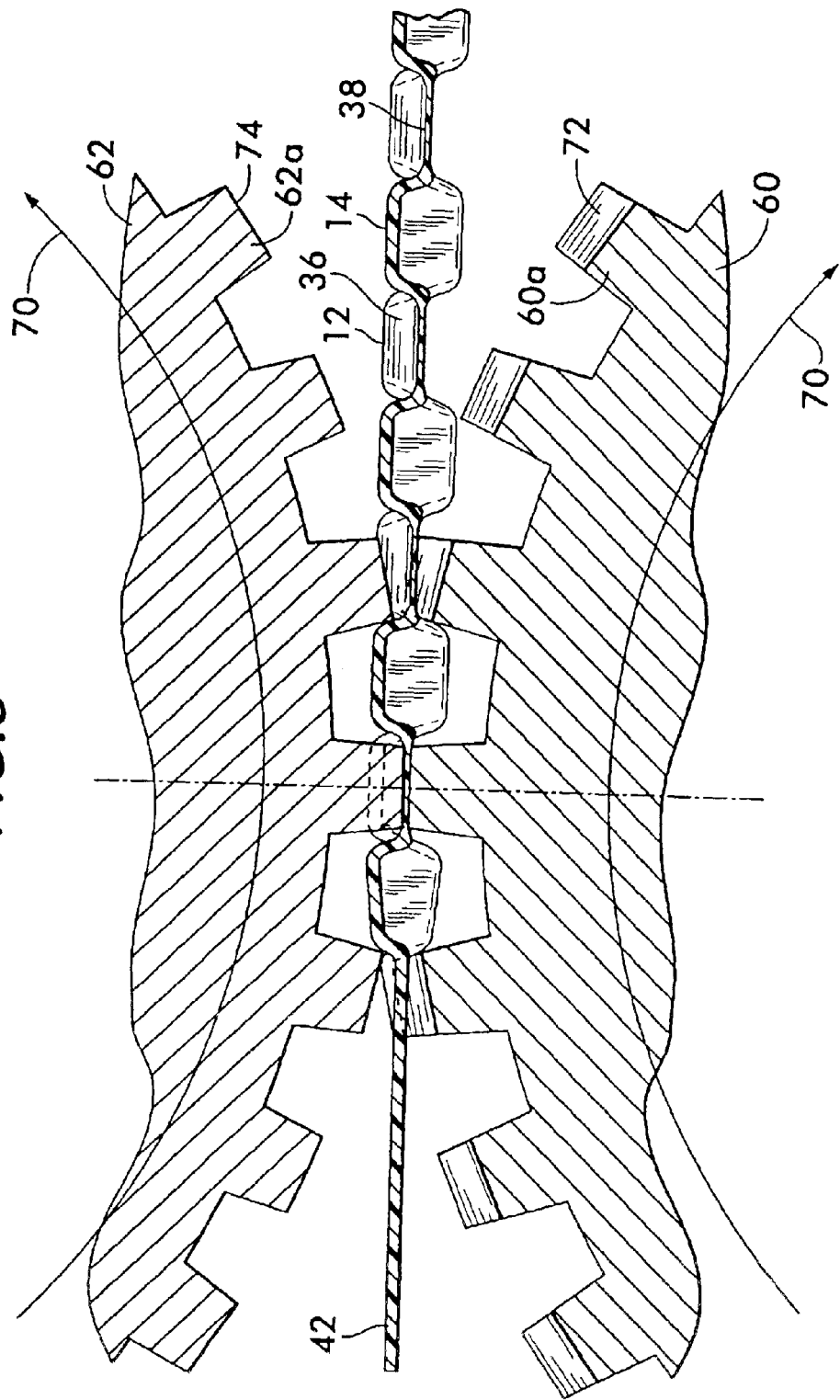

LOW-PROFILE PROTECTIVE SHEATH WITH CORRUGATIONS AND A HINGE AND APPARATUS AND METHOD OF MANUFACTURE THEREFOR

FIELD OF THE INVENTION

This invention concerns low-profile sheathing for encasing and protecting elongated items, such as electrical wiring, which is routed within the passenger compartment or trunk of an automobile.

BACKGROUND OF THE INVENTION

Electrical wiring is used extensively in automotive applications where it is routed through the various compartments of the car, such as the passenger compartment, the trunk or along the inside of the roof, to provide electrical power to lights, radios, speakers or other electrical or electronic components within the automobile. It is advantageous to encase elongated items such as wiring within a sheath which organizes and protects the wiring. Organizing the wiring is accomplished by capturing and grouping the various wires within one or more sheaths. This avoids an unsightly tangle of wires within the automobile which can be inadvertently snagged and possibly severed or disengaged from a terminal. Organizing the wiring also allows for rapid identification of the wires, thereby providing for efficient troubleshooting and repair. These are desirable characteristics as automotive electrical system problems tend to be difficult to diagnose and time consuming to repair.

Protection of the wiring is also desirable to prevent physical damage to both the wiring and its insulation due to abrasion and pinching. Abrasion of the wiring may be caused by vibration of the car structure due to rough engine operation and road roughness. The wiring responds to the vibration and rubs against a nearby portion of the chassis. Abrasion, as well as pinching, may be caused by physical contact of the wiring with passengers as they enter or exit the vehicle or cargo as it is placed in the trunk. Pinching of a wire, for example, between a sharp edge on the chassis and the foot of a passenger can sever a wire, and abrasion of the wire by repeated rubbing motion against the chassis can cause a short circuit by wearing the insulation away and allowing the bare wire to contact a metal part of the chassis which is typically at negative electrical potential. Short circuits in the electrical system of an automobile usually lead to equipment failure can cause a dead battery and may result in a serious fire.

In order to allow the wiring to pass within the various compartments of the automobile, it is desired that the protective sheathing have a low profile, i.e., be substantially flat so as to fit unobtrusively between carpeting and the floor or side panel within the passenger compartment or trunk or between the roof and the roof lining. The sheathing should also be substantially stiff in a direction transverse to its width so as to be able to effectively capture and hold the wiring in place in a substantially flat configuration. At the same time, the sheathing should be relatively flexible transverse to its length so as to bend readily and follow contours of the automobile chassis.

Protective sheathing for elongated items should also be economical to produce, easy to incorporate into an existing layout or design and have reliable means for sealing and unsealing the sheathing so that it can readily receive wiring and then securely capture and protect it.

SUMMARY AND OBJECTS OF THE INVENTION

The invention concerns a sheath for receiving and protecting elongated items. The sheath comprises first and second elongated substrates, each having opposite edges defining a width of each substrate. The edges of one substrate are paired with the edges of the other substrate. One of the pairs of edges is flexibly joined lengthwise of the substrates to form a hinge. The hinge is pivotally movable between an open position, wherein the first and second substrates are angularly oriented with respect to one another, and a closed position, wherein the first and second substrates are overlying one another in substantially parallel relationship. The sheath has means for securing the first and second substrates in the closed position mounted along the other pair of edges opposite to the hinge. The elongated items are received between the substrates when the substrates are in the open position and captured between the substrates when they are in the closed position. Corrugations are formed in the substrates transversely to the width to provide increased bending stiffness about the long axis of the sheath while simultaneously providing bending flexibility perpendicular to the long axis.

Preferably, the first and second substrates are integrally formed from a single sheet of material, such as a thermoplastic which is heat formable into a desired shape. The hinge may comprise a substantially continuous region of the sheet having reduced thickness and positioned between and thereby defining one of the edges of the first and second substrates. The reduced thickness region provides flexibility allowing the hinge to bend easily between the open and closed positions.

Preferably, the hinge is formed by a plurality of first regions of the sheet having reduced thickness. The first regions of reduced thickness are oriented to be substantially within the plane of the sheet forming the hinge. The hinge further includes a plurality of second regions of the sheet also having reduced thickness. The second regions of reduced thickness are oriented substantially perpendicularly to the plane of the sheet and are connected to the first and second substrates by respective connecting portions of the sheet. Each of the connecting portions are bent through a substantially right angle, one right angle connecting portion being positioned on either side of each of the second regions of reduced thickness. The first and second regions of reduced thickness are positioned one behind the other in an alternating pattern lengthwise along the substrates.

The invention further includes an apparatus for forming the flexible hinge between two substrates described above. The hinge and the substrates comprise a flexible sheet material, such as a thermoplastic, which is formable into a predetermined shape when heated and which holds the shape upon cooling. The apparatus comprises a first gear having gear teeth and being rotatable about a first axis, a second gear having gear teeth and being rotatable about a second axis arranged in a substantially parallel, spaced relation to the first axis such that the gear teeth on the first and second gears intermesh. The apparatus also includes a third gear having gear teeth and being rotatable about the first axis in fixed relation with the first gear. The third gear is positioned adjacent to the first gear. A fourth gear having gear teeth is rotatable about the second axis in fixed relation with the second gear. The gear teeth on the fourth gear intermesh with the gear teeth on the third gear, and the fourth gear is positioned adjacent to the second gear.

The gear teeth on the first and fourth gears each have respective beveled faces which move into and out of overlapping alignment with one another upon rotation of the gears. Each of the beveled faces are separated by a first gap when aligned. The sheet material, when heated, is fed between the intermeshing teeth of the first, second, third and fourth gears and is thereby deformed to comply with the shape of the gear teeth. The beveled faces of the first and the fourth gears form a plurality of first regions of reduced thickness at spaced intervals along the sheet material as the sheet material passes through the first gap. The first regions of reduced thickness define the hinge and divide the sheet material into the substrates.

The gear teeth on the second and third gears each have respective side surfaces which move into and out of overlapping alignment with one another upon rotation of the gears. The side surfaces are separated from one another by a second gap. The gear teeth on the second and third gears each have radially outwardly facing surfaces offset from one another. The sheet material, when heated and fed between the intermeshing gear teeth as described above, passes through the gap between the side surfaces of the second and third gears, thereby forming a plurality of second regions of reduced thickness at spaced intervals along the sheet material. The second regions of reduced thickness are interspersed between the first regions of reduced thickness. The facing surfaces and the teeth of the second and third gears intermesh with the first and second gears and bend the sheet material through a first and a second substantially right angle bend thereby orienting the second regions of reduced thickness substantially perpendicularly to the sheet material. Together with the first regions of reduced thickness, the second regions of reduced thickness also define the hinge and divide the sheet material into the substrates.

The invention further includes a method of forming a flexible hinge comprising a plurality of first and second regions of reduced thickness as described above. The method comprises the steps of:

(A) providing a flexible sheet comprising a material which is formable into a predetermined shape when heated to a predetermined temperature and which holds the shape upon cooling;

(B) heating the sheet material to the predetermined temperature;

(C) forming a plurality of first regions of reduced thickness at spaced intervals along the sheet material, the first regions being positioned substantially in the plane of the sheet material;

(D) forming a plurality of second regions of reduced thickness at spaced intervals along the sheet material, the second regions being interspersed between the first regions and being oriented substantially perpendicularly to the plane of the sheet material;

(E) bending the sheet material through a first and a second substantially right angle bend on either side of each of the second regions of reduced thickness; and (F) cooling the sheet material to fix the first and the second regions of reduced thickness and the right angle bends, the first and second regions defining the hinge.

It is an object of the invention to provide a low-profile sheath for protecting elongated items.

It is another object of the invention to provide a low-profile sheath having stiffening corrugations.

It is another object of the invention to provide a low-profile sheath having a hinge.

It is another object of the invention to provide a hinge which compensates for the difference in shear stiffness between the hinged edge and free edges of the sheath.

It is still another object of the invention to provide an apparatus for manufacturing a low-profile sheath.

It is yet another object of the invention to provide an apparatus for manufacturing a hinge usable with the low-profile sheath.

These and other objects of the invention will become apparent upon consideration of the following drawings and detailed description of the preferred embodiments.

BRIEF DESCRIPTION OF THE DRAWINGS

FIG. 8 is a partial sectional view taken along lines 8–8 of FIG. 7;

DETAILED DESCRIPTION OF THE PREFERRED EMBODIMENTS

Figure 1:
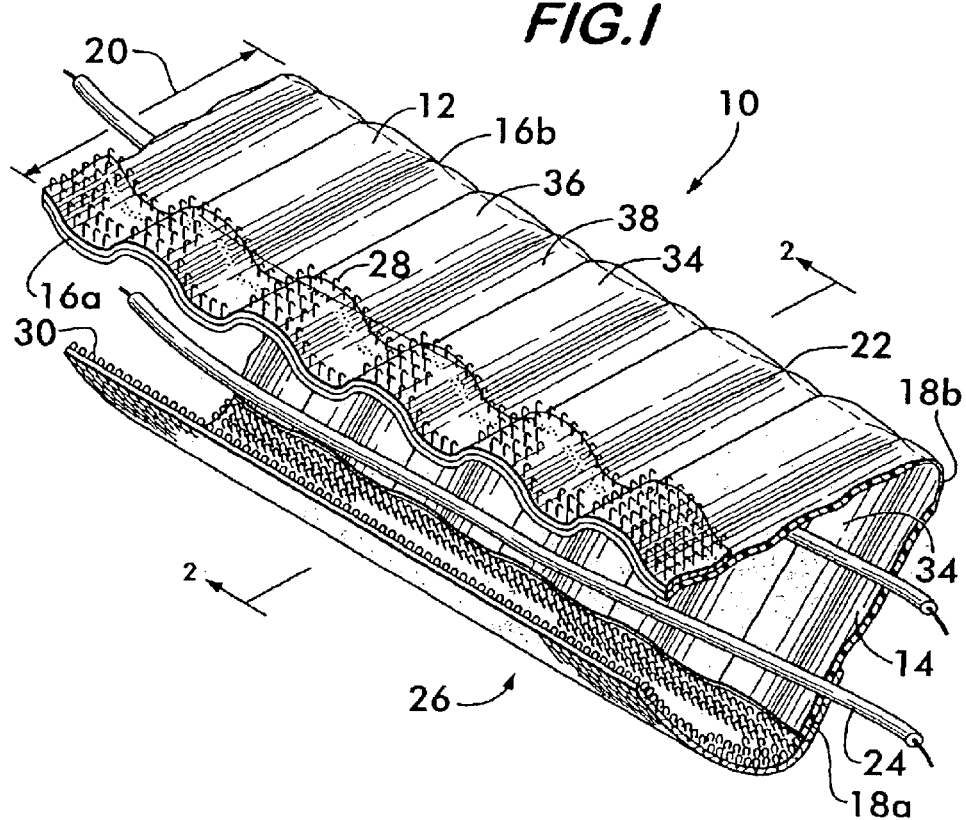
FIG. 1 is a perspective view of the low-profile sheath shown in an open position.

FIG. 1 shows a low-profile protective sheath 10 according to the invention. Sheath 10 is formed from a pair of elongated substrates 12 and 14. Substrates 12 and 14 each have respective opposite edges 16a and 16b, and 18a and 18b, the distance between the edges defining the width 20 of the substrates and the sheath 10. Edges 16a and 16b of substrate 12 are paired with corresponding edges 18a and 18b of substrate 14 and the paired edges 16b and 18b are flexibly joined to each other lengthwise along the substrates 12 and 14 by means of a hinge 22. Hinge 22 is pivotally movable between an open position, shown in FIG. 1, wherein the substrates 12 and 14 are angularly oriented with respect to one another and a closed position shown in FIG. 2, wherein the substrates 12 and 14 are overlying one another in substantially parallel relationship. In the open position of FIG. 1, the sheath 10 may receive elongated items such as wires 24. When in the closed position, shown in FIG. 2, the sheath 10 captures and protects the wires 24, the sheath being held in the closed position by a means 26 for securing the substrates 12 and 14 to each other along paired edges 16a and 18a. The preferred embodiment of securing means 26 comprises a hook 28 and loop 30 fastener system attached respectively to edges 16a and 18a, but many other forms of securing means are also feasible. For example, buttons, snap fasteners, lacing, zippers, interlocking male and female components and the like may also be used.

Sheath 10 is preferably formed from extruded polymer sheet as described in detail below. Nylon is advantageous because it is inexpensive, tough, resilient, flexible and compatible with hook-and-loop fastener systems also made of nylon. The material compatibility allows both the hooks 28 and loops 30 to be attached to the respective substrates 12 and 14 by means of ultrasonic welding, such welds 32 shown in FIG. 2. The hooks and loops could also be adhesively attached or sewn onto the substrates 12 and 14. While thermoplastic or thermosettable polymers are preferred, the sheath may also be formed from materials such as aluminum, copper or steel alloys which are yieldably formable, for example, by cold working, into a desired shape.

Substrates 12 and 14 preferably have corrugations 34 comprising a plurality of crests 36 and troughs 38 arranged one behind another in alternating fashion. Corrugations 34 preferably extend transversely to the length of the sheath, spanning the width 20 of the substrates 12 and 14. Corrugations 34 increase the width-wise bending stiffness of sheath 10 while simultaneously providing lengthwise bending flexibility, allowing the sheath to conform to undulating or curved contours when in use. Preferably, the crests 36 on one of the substrates are aligned with the troughs 38 on the other substrate, thereby allowing the crests to nest within the troughs when the substrates 12 and 14 are in the closed position. Alternately, the crests 36 on one substrate may align with crests 36 on the other substrate to permit the crests to interface with each other when the substrates 12 and 14 are in the closed position.

Figure 2:
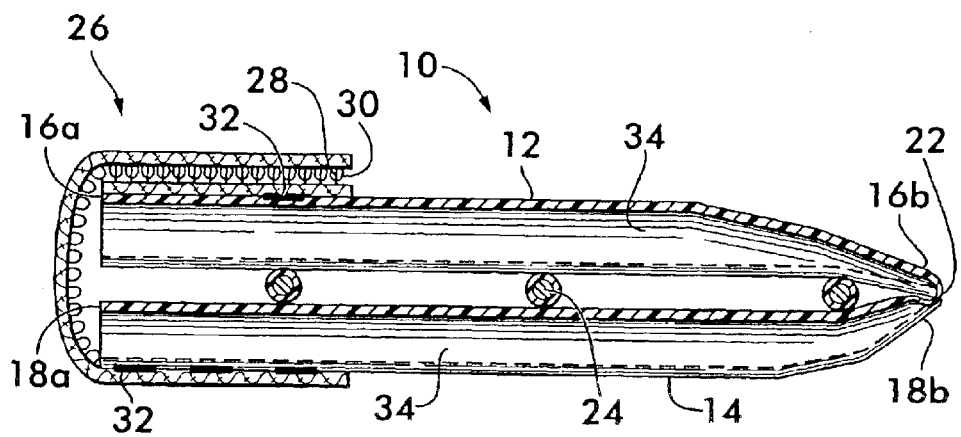
FIG. 2 is a cross-sectional view taken along lines 2–2 of FIG. 1 and showing the sheath in a closed position.
Figure 3:
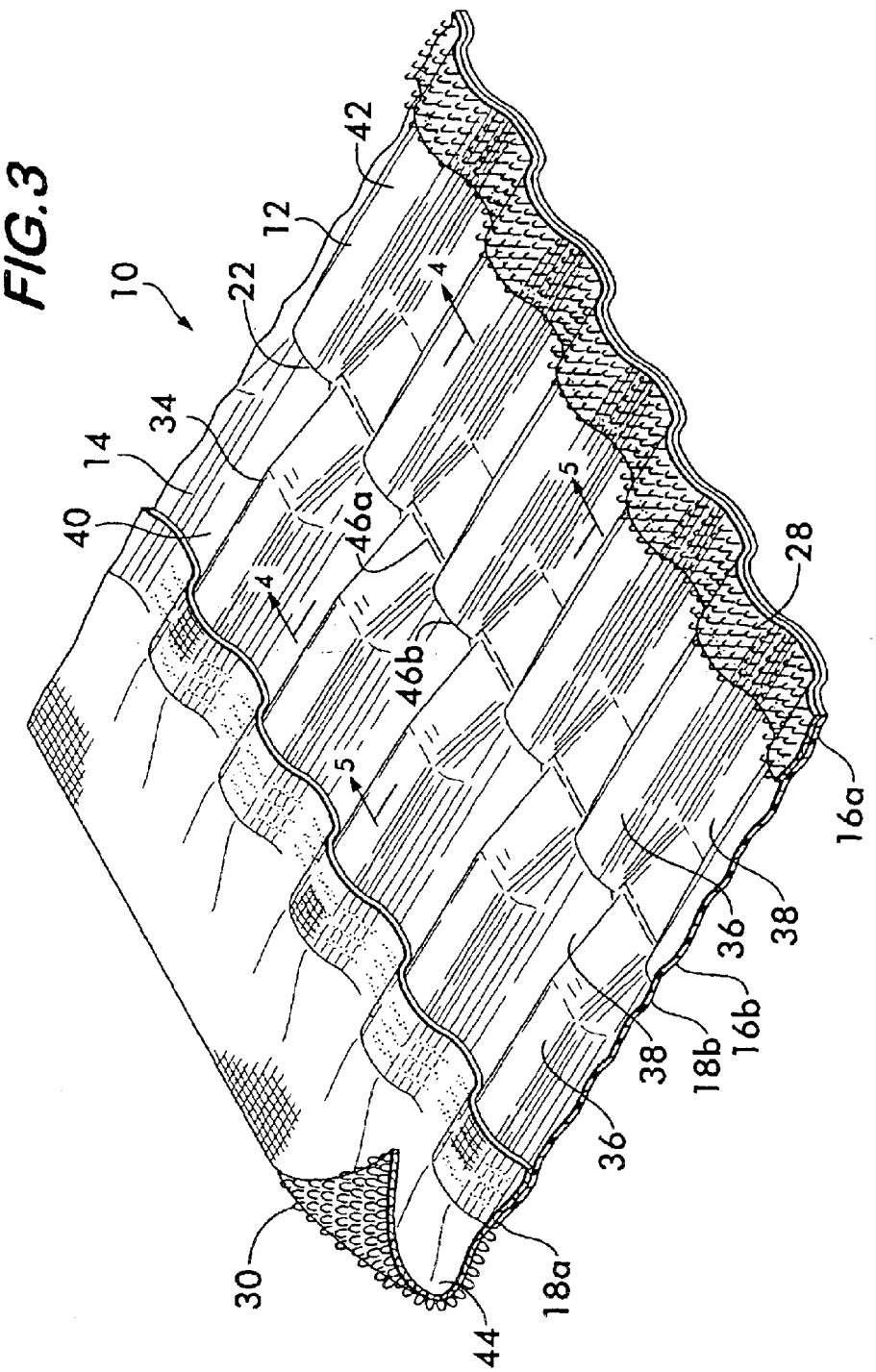
FIG. 3 is a perspective view of the sheath in a flat configuration before folding about its hinge.

FIG. 3 shows a perspective view of the outside surface 40 of the sheath 10 before it is folded along hinge 22. Preferably, the substrates 12 and 14 are integrally formed from a single sheet of material 42. The loops 30 are positioned on a flexible layer 44 which extends outwardly from edge 18a of substrate 14. The flexible layer 44 is designed to wrap around edges 16a and 18a when the sheath 10 is in the closed position (see FIG. 2) thereby providing added security to the closure of the sheath. Using the wrap around design of layer 44 allows both the hooks 28 and the loops 30 of the securing means 26 to be attached to the same surface (outer surface 40) of the sheath, thus, simplifying the manufacturing process.

Figure 4:
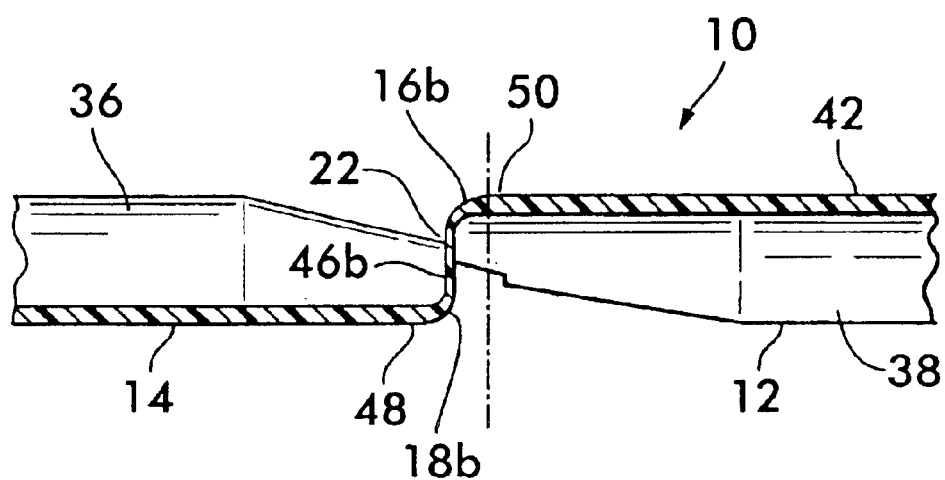
FIG. 4 is a cross-sectional view taken along line 4–4 of FIG. 3.
Figure 5:
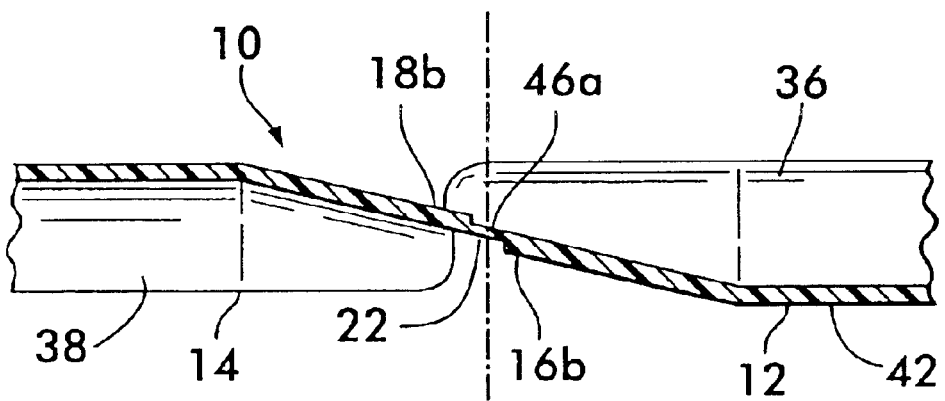
FIG. 5 is a cross-sectional view taken along line 5–5 of FIG. 3.

FIG. 3 also illustrates the unique features of hinge 22, which generally comprises a plurality of regions 46a and 46b joining substrates 12 and 14, the regions 46a and 46b having reduced thickness as compared with the thickness of the substrates. Regions 46a and 46b of reduced thickness are positioned in an alternating pattern one behind another lengthwise along substrates 12 and 14 and form a line of increased flexibility defining the hinge 22 and allowing the substrates to be repeatedly pivoted between the open and closed positions of FIGS. 1 and 2. As best shown in FIG. 5, the regions 46a of reduced thickness are oriented substantially in the plane of the sheet 42 from which the substrates are formed. FIG. 4 shows the regions 46b, which are oriented substantially perpendicularly to the plane of sheet 42 and are connected to the substrates 12 and 14 by connecting portions 48 and 50. Each connecting portion is bent through a substantially right angle to effect the connection between regions 46a to each of the substrates 12 and 14.

Hinge 22 is formed of the alternating regions 46a and 46b to provide greater in-plane flexibility and symmetry to the sheath 10 when in the closed position shown in FIG. 2. Normally the hinged edges 16b–18b are stiffer in shear than the edges 16a–18a attached to one another by the securing means 26, creating a shear stiffness imbalance between the edges which prevents the substrates 12 and 14 from sliding symmetrically relatively to one another in the plane of the sheath when the sheath is bent or twisted. This shear stiffness imbalance inhibits the ability of the sheath 10 to bend and twist in order to follow surface contours. Forming hinge 22 of alternating regions of differing orientation provides a hinge having greater shear flexibility and helps balance the stiffness of the hinged edges 16b–18b with the stiffness of the edges 16a–18a joined by the securing means 26. A closer balance in stiffness allows the sheath to bend more symmetrically and conform more readily to surface contours. A closer shear stiffness balance also helps the sheath maintain an initially straight course as manufactured, the sheath not being biased to curve in the plane of the sheath either toward or away from the hinge line and thereby follow contours sloping or curving in any direction with almost the same facility.

Figure 6:
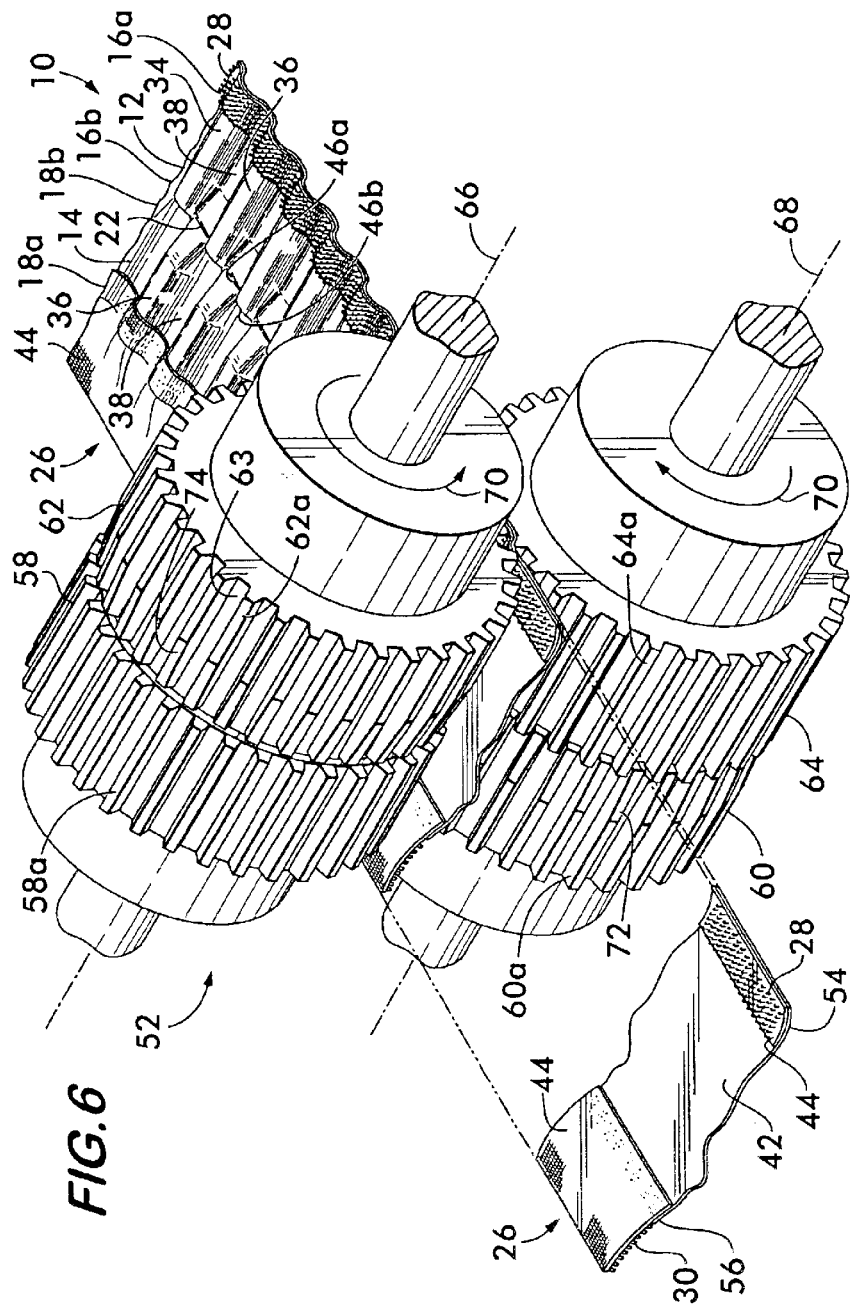
FIG. 6 is a perspective view of an apparatus for making the sheath.
Figure 11:
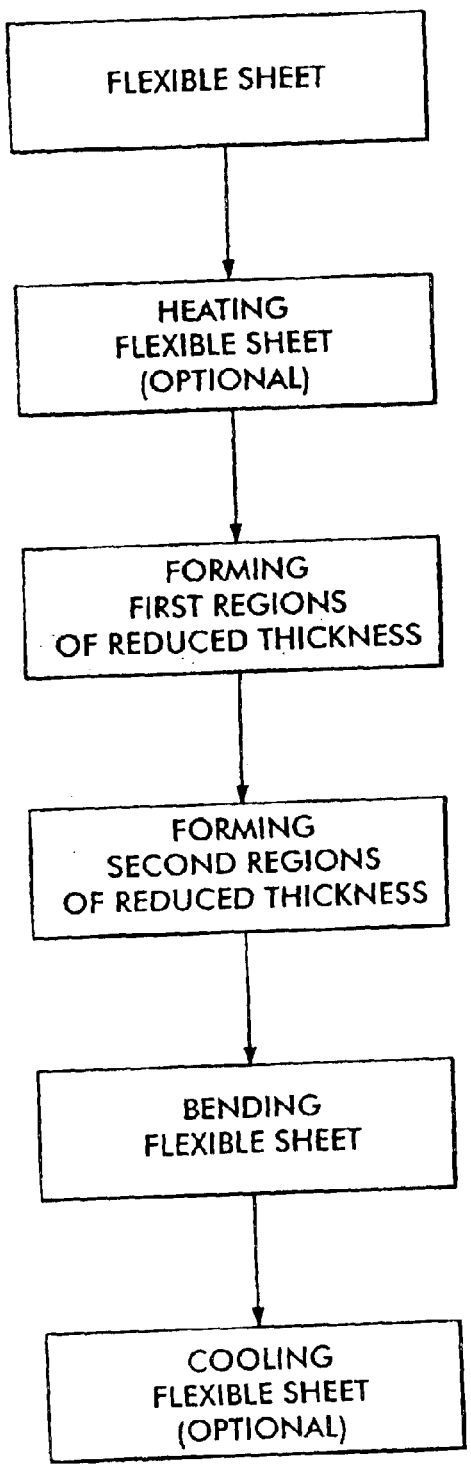
FIG. 11 is a flow chart which describes a method of making the sheath.

FIG. 6 shows an apparatus 52 used to manufacture the sheath 10 according to the invention. In the course of manufacture, a continuous length of flexible sheet material 42, preferably a thermoplastic material, is sized to a width which will yield the sheath 10 having the desired width when folded into the closed position. Securing means 26, preferably in the form of hooks 28 and loops 30 on flexible layers 44 are attached to the opposite edges 54 and 56 of sheet 42. Preferably, the layers 44 are of the same material as the sheet 42 allowing attachment by ultrasonic welding. The sheet material is then heated and passed through apparatus 52 which forms corrugations 34 and hinge regions 46a and 46b while cooling the sheet, the sheet material, upon cooling being fixed into the shape imparted by apparatus 52. FIG. 11 provides a flow chart which describes aspects of the manufacturing process.

As shown in FIG. 6, apparatus 52 comprises four gears 58, 60, 62 and 64 which mesh with one another as gear pairs, i.e., gear 58 meshes with gear 60 and gear 62 meshes with gear 64. The gears 58–64 are preferably spur gears although other types of gears, such as helical gears or beveled gears, may also be feasible for particular applications. Gear 58 rotates about an axis 66 and gear 60 rotates about another axis 68, the gears rotating in the directions shown by arrows 70. The axes 66 and 68 are preferably in substantially parallel, spaced relation to each other. Gear 62 also rotates about axis 66 and gear 64 also rotates about axis 68. Gears 58 and 62 rotate in fixed relation to each other, as do gears 60 and 64 also. As sheet 42 is fed between the gear pairs, teeth 58a on gear 58 mesh with teeth 60a on gear 60 to form corrugations 34 in the sheet 42 which appear on substrate 14. Simultaneously, teeth 62a on gear 62 mesh with teeth 64a on gear 64 to form the corrugations 34 on substrate 12. So that the crests 36 on substrate 12 align with the troughs 38 on substrate 14 and vice versa, the teeth 58a are angularly offset from the teeth 62a and the teeth 60a are similarly angularly offset from the teeth 64a. The offset of the teeth is apparent in FIG. 6, which shows the teeth 58a on gear 58 aligned with the space 63 between the teeth 62a on gear 62. The same relation is shown between the teeth 60a and 64a of gears 60 and 64 respectively.

Figure 7:
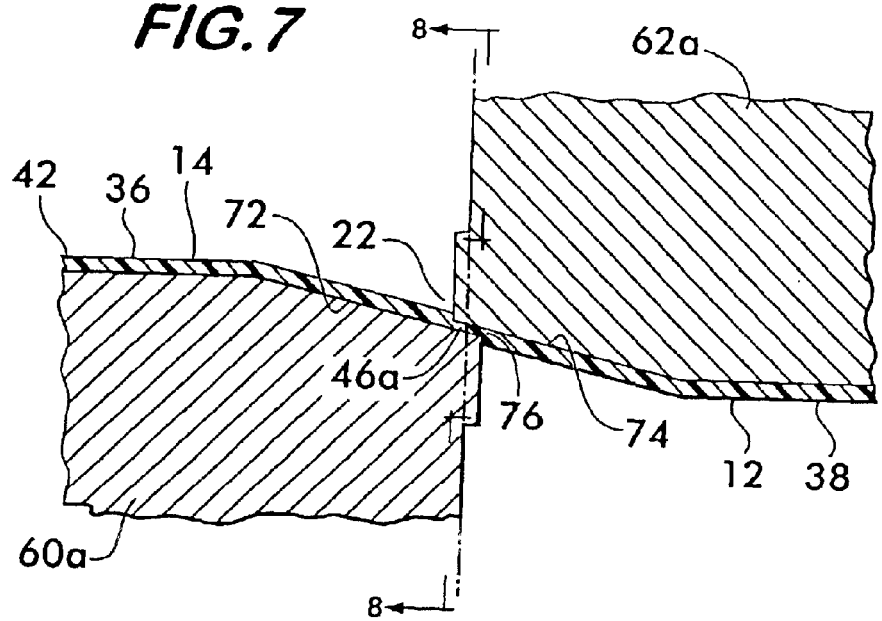
FIG. 7 is a partial sectional view showing the relation of the upper right and lower left diagonally opposed teeth of FIG. 6.
Figure 10:
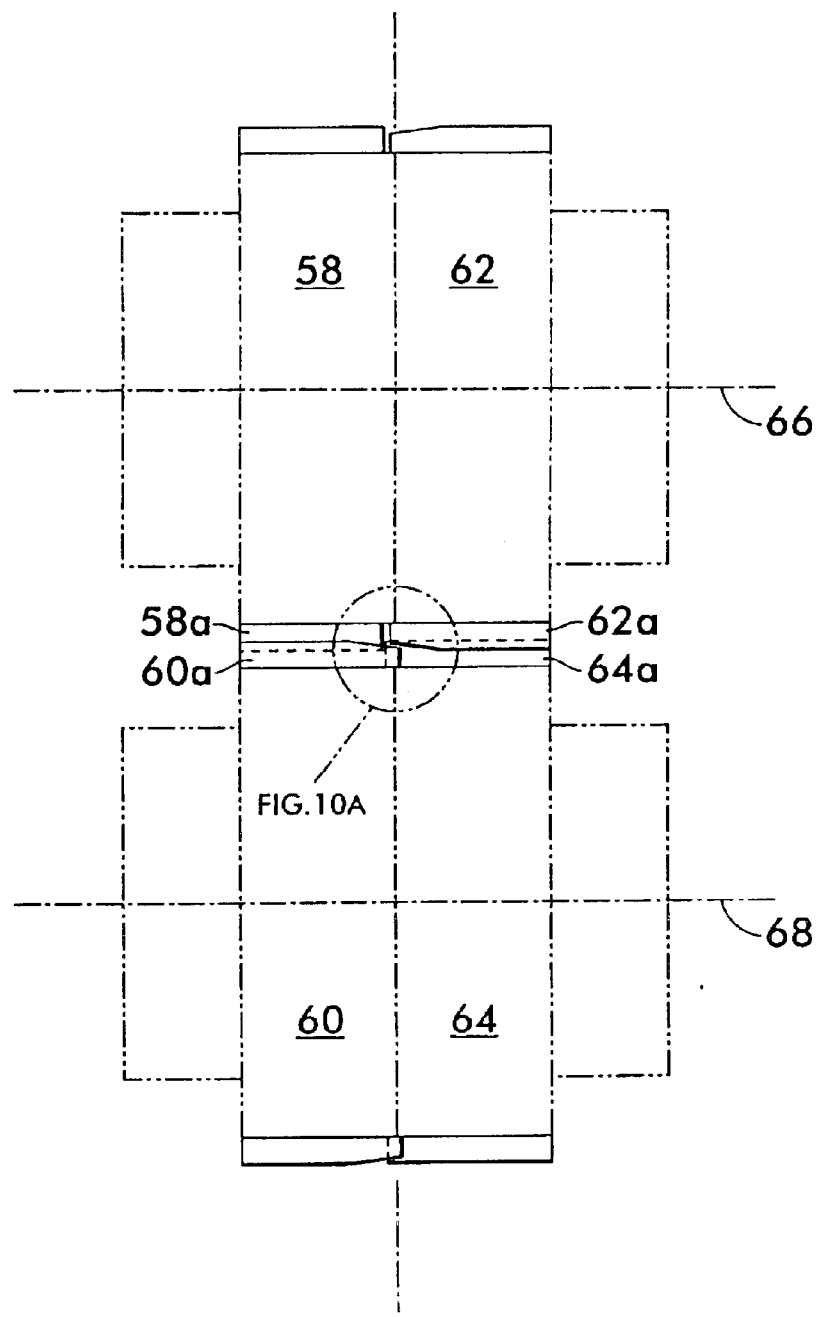
FIG. 10 is a front view of the apparatus shown in FIG. 6.
Figure 10A:
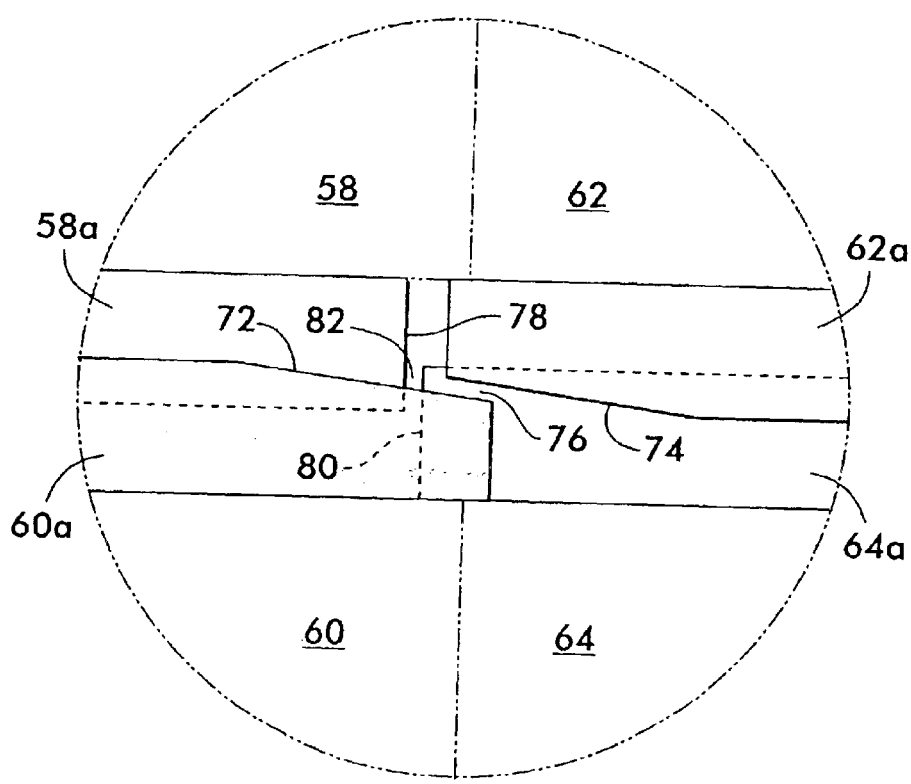
FIG. 10A is a detailed view of a portion of FIG. 10 within the broken line circle and shown on an enlarged scale.

While the teeth 58a, 60a, 62a and 64a work together as meshing gear pairs to form the corrugations 34, the teeth 60a and 62a on gears 60 and 62, which are diagonally opposite one another, cooperate to form regions 46a of reduced thickness comprising hinge 22. As shown in FIG. 6, teeth 60a and teeth 62a each have a respective beveled face portion 72 and 74 positioned adjacent to their neighbor gear. As shown in FIGS. 10 and 10A, the beveled face portions 72 and 74 on each gear move into overlapping alignment during rotation of the gears. The beveled face portions 72 and 74 are separated by a gap 76 which allows the gears to align and pass one another without interfering. As shown in FIG. 7, which depicts a pair of gear teeth 60a and 62a in isolation and engaging sheet 42, the gap 76 between the beveled face portions 72 and 74 form the region 46a of reduced thickness of hinge 22 by pinching the sheet material 42 as it is fed through the meshing gears. The size of the gap 76 determines the thickness of the regions 46a. FIG. 8 is a cross-section taken through the gap 76 between the beveled face portions 72 and 74 of gears 60 and 62 and shows how the regions 46a are formed in sequence, one behind the other in spaced relation, as the gear teeth 60a and 62a move into and out of overlapping alignment. It should be understood that FIGS. 7 and 8 do not show gear pairs which mesh, they show the gear teeth 60a and 62a on diagonally opposed gears 60 and 62 in FIG. 6 which cooperate to form the region 46a of reduced thickness. As best shown in FIG. 7, the region 46a is oriented substantially in the plane of the sheet material 42 due to the relationship between the beveled face portions 72 and 74.

Figure 9:
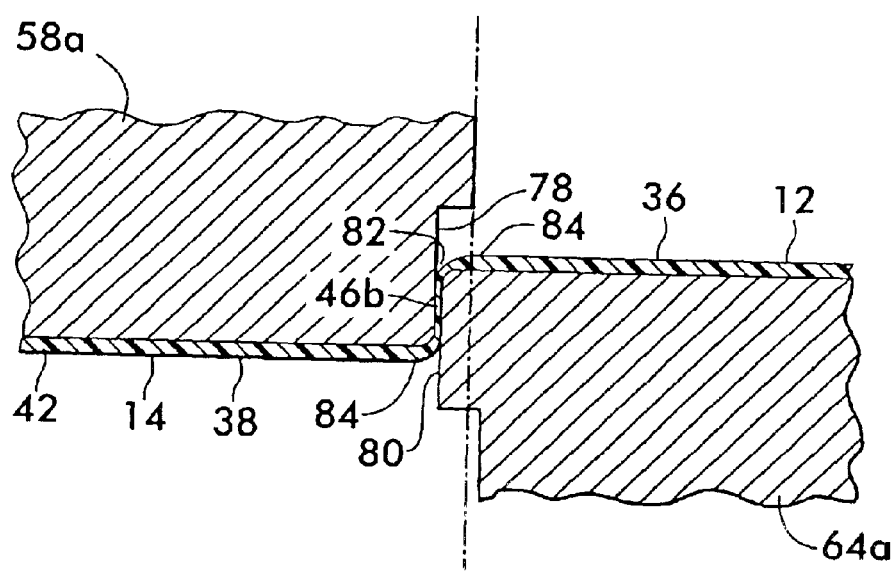
FIG. 9 is a partial sectional view showing the relation of the upper left and lower right diagonally opposed teeth of FIG. 6.

While the beveled face portions 72 and 74 of the teeth of gears 60 and 62 are cooperating to form regions 46a, the other diagonally opposed gears 58 and 64 are cooperating to form the regions 46b of reduced thickness. As shown in dotted lines in FIGS. 10 and 10A, teeth 58a and 64a each have respective side surfaces 78 and 80 which face one another and move into and out of alignment as the gears rotate. Side surfaces 78 and 80 are separated by a vertically oriented gap 82 which allows the teeth to pass one another without interference. As shown in FIG. 9, teeth 58a and 64a cooperate to form the region 46b by pinching the sheet material 42 between the side surfaces 78 and 80, the size of the gap 82 determining the thickness of the region 46a. Being heated and plastically compliant, sheet material 42 conforms to the shape of teeth 58a and 64a, the vertical orientation of the gap orienting the region 46b substantially perpendicular to the plane of the sheet material 42, the sheet material further bending through a right angle to form connecting portions 84 on each side of the region 46b to ensure continuity of attachment of the substrates 12 and 14. As shown in FIG. 10A, the regions 46b may be offset along the axis of rotation of the gears relative to the regions 46a by positioning the gap 82 to one side or the other of the gap 76 between the teeth 60a and 62a. Because teeth 58a are angularly offset from teeth 62a, and teeth 60a are angularly offset from teeth 64a as described above, the regions 46b are formed interspersed between regions 46a as each set of teeth 58a and 64a, 60a and 62a, alternately align with one another as the gears rotate.

The gears are preferably made from metal such as steel and have a natural tendency to draw heat from the sheet material as it passes between them, thus, cooling the sheet material and locking the substrates 12 and 14 into their final corrugated shape. If necessary, the gears may also be liquid or air cooled.

Figure 12:
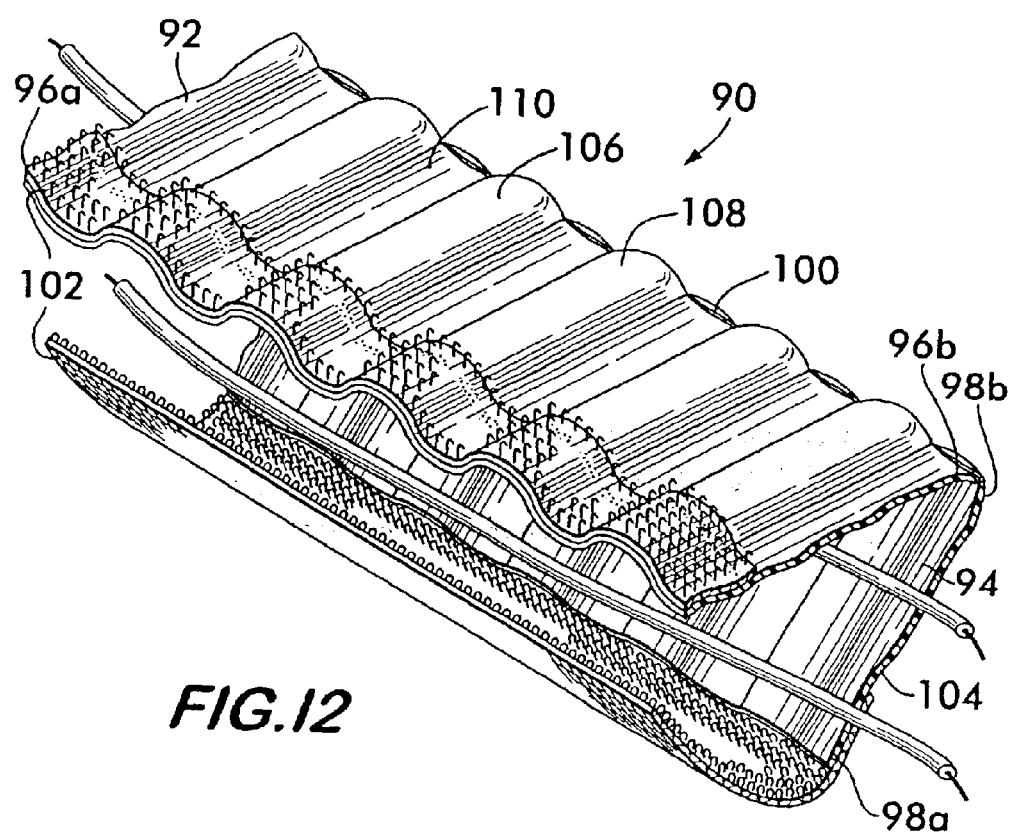
FIGS. 12 and 13 illustrate an alternate embodiment of the sheath according to the invention.
Figure 13:
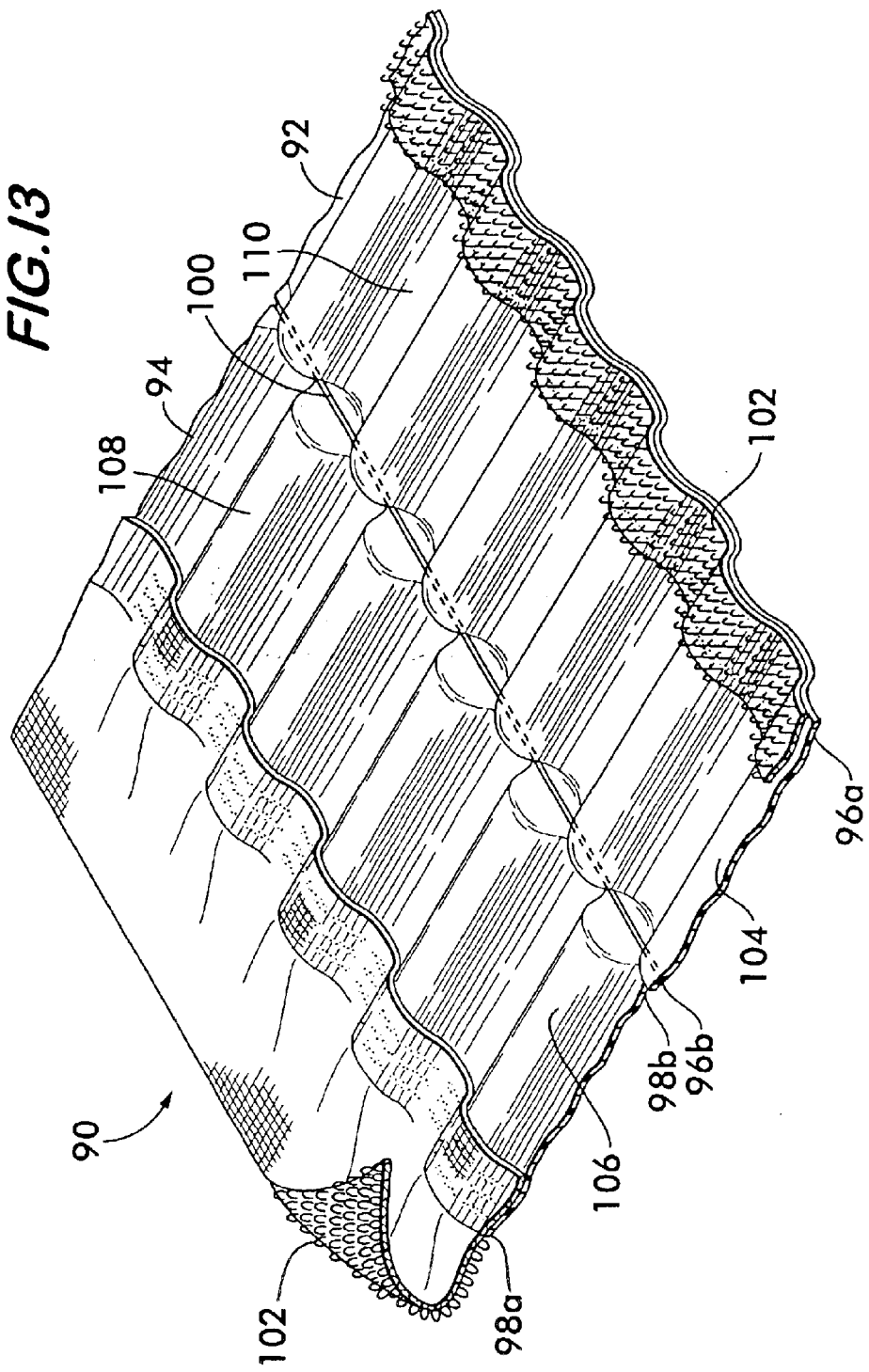

Additional embodiments of the sheath according to the invention are also contemplated, one of which is shown in FIGS. 12 and 13. In this embodiment, a sheath 90 is again formed of elongated substrates 92 and 94, each substrate having respective opposite edges 96a and 96b and 98a and 98b. Edges 96b and 98b are flexibly joined by a hinge 100 and edges 96a and 98a are separably attachable to each other by a securing means 102. A hook and loop fastening system is shown, but the securing means could be any manner of fasteners or attachments as previously described. The substrates 92 and 94 are pivotable about hinge 100 between an open position and a closed position and held in the closed position by the securing means. As with the previous embodiment, sheath 90 is preferably formed from extruded polymer sheet 104 and has corrugations 106 for added widthwise stiffness.

Hinge 100 differs from the hinge previously described in that it is formed by simply thinning the sheet material 104 comprising the substrates 92 and 94 (preferably before the corrugations are formed) lengthwise along the sheath. The thinning may be accomplished by any one of many different methods. For example, the hinge 100 may be formed by scoring the sheet material with a knife or stylus (heated or cold), passing the sheet material through a die having pinching rollers which apply continuous pressure along a narrow band between the substrates, application of pressure and heat in the form of ultrasonic energy concentrated along the hinge line to effect a thinned region, or by any other process which will cause a thinning of the sheet 104 lengthwise along and between the substrates 92 and 94. The simplest method is merely to fold the sheet material 104 lengthwise in half and then apply pressure to the folded sheet, for example between rollers or corrugating gears. The pressure from the rollers or gears causes a kink to form along the fold line, the kink resulting in a thinning of the material along the fold line to form a continuous hinge about which the substrates may bend repeatedly.

One method of forming sheath 90 is to first form the hinge 100 in flat extruded sheet material 104 by one of the procedures outlined above, attach the securing means 102 to edges 96a and 98a, fold the substrates 92 and 94 about the hinge 100 into the closed position and then form the corrugations 106 by passing the folded sheet material through a single pair of intermeshing corrugating gears (not shown). The corrugations are preferably formed while the sheet material 104 is still hot, and cooling of the sheet material permanently sets the corrugations in the sheet material. Because the corrugations are formed with the substrates 92 and 94 in the closed position (sheet material 104 folded) the crests 108 and troughs 110 of the corrugations are aligned with one another as shown in FIG. 13 and nest within one another when the substrates are in the closed position.

Figure 14:
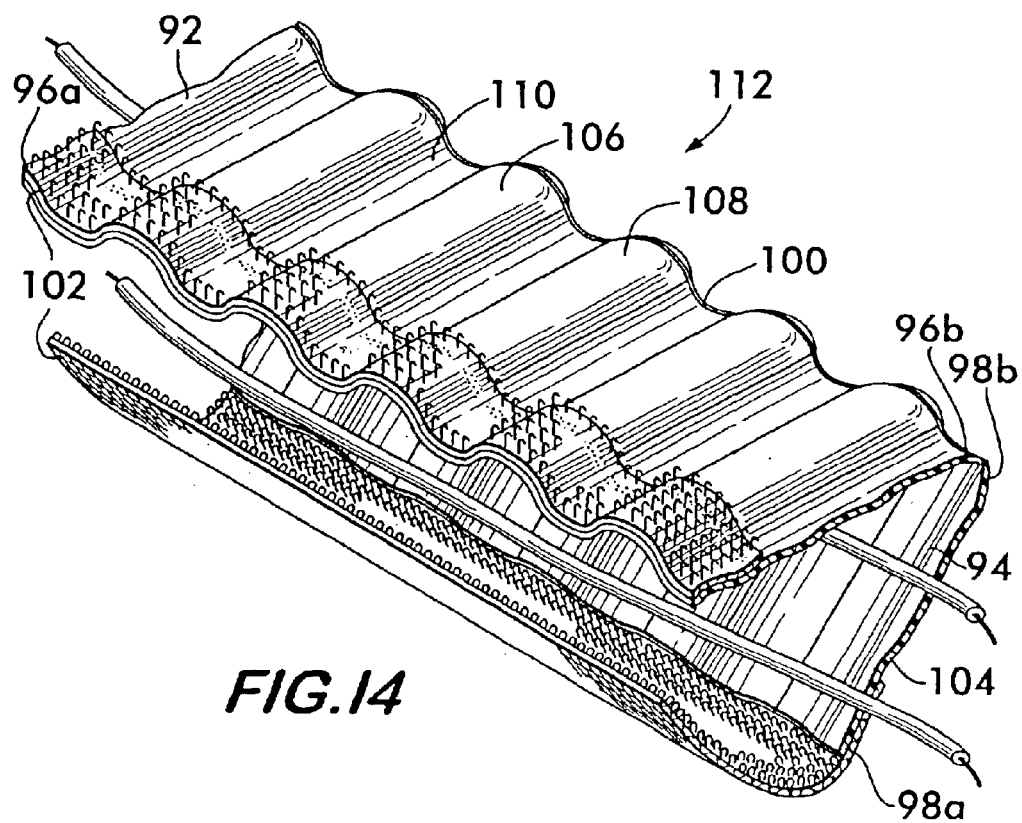
FIGS. 14 and 15 illustrate another alternate embodiment of the sheath according to the invention.
Figure 15:
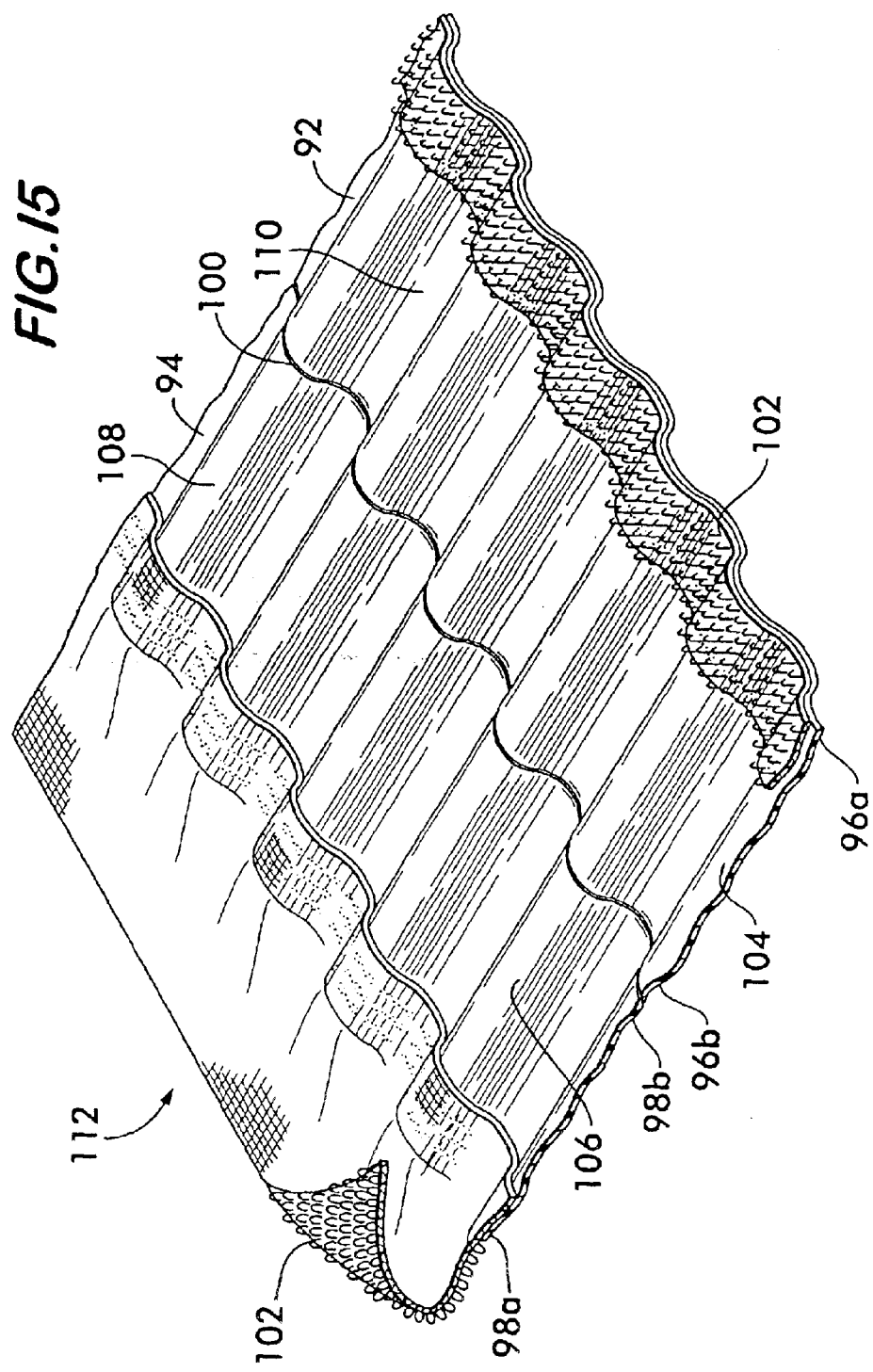

In another embodiment of the sheath shown in FIGS. 14 and 15, a sheath 112 is formed wherein the crests 108 and troughs 110 of the corrugations 106 do not nest within one another. As best shown in FIG. 15, crests 108 on one substrate 92 align with crests 108 on the other substrate 94, and troughs 110 align with troughs. Sheath 112 is manufactured by forming a hinge 100 in extruded sheet material 104, attaching securing means 102 to the edges 96a and 98a of the substrates 92 and 94, and then forming the corrugations 106 by passing the sheet material 104, before folding, through a single pair of intermeshing corrugating gears (not shown). Because the substrates 92 and 94 are not folded prior to formation of the corrugations 106 the crests 108 align with crests and troughs 110 with troughs on each substrate.

Figure 16:
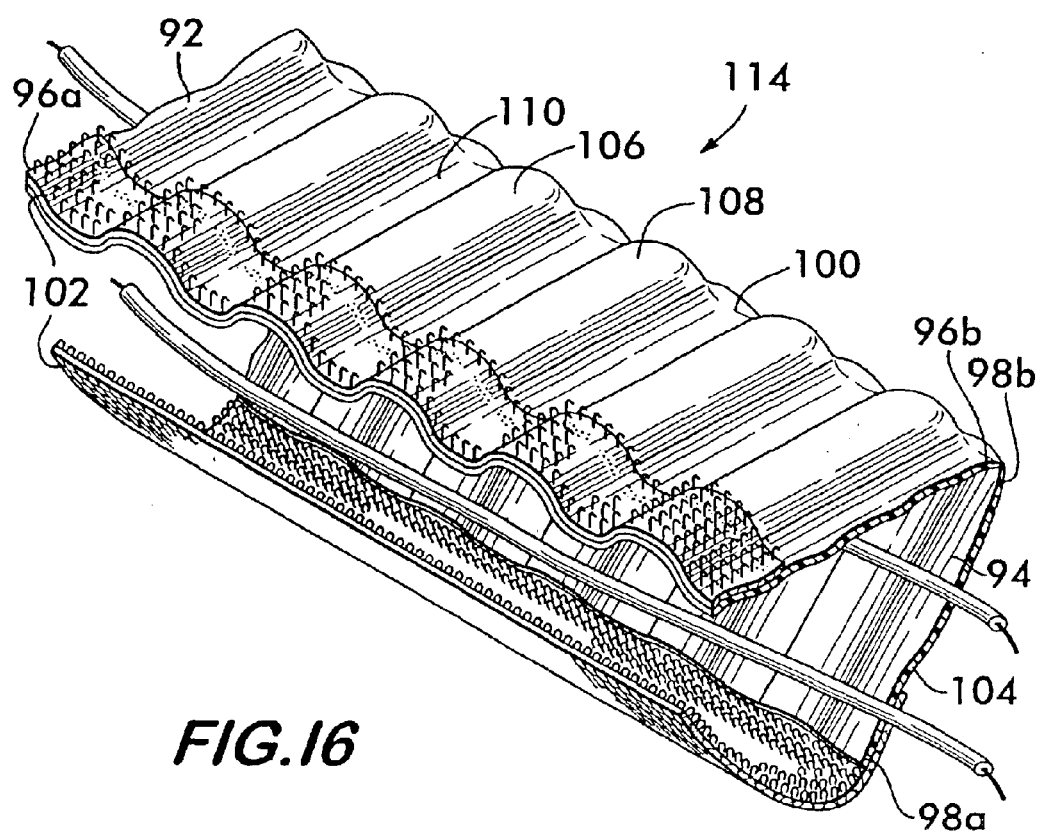
FIGS. 16 and 17 illustrate yet another alternate embodiment of the sheath according to the invention.
Figure 17:
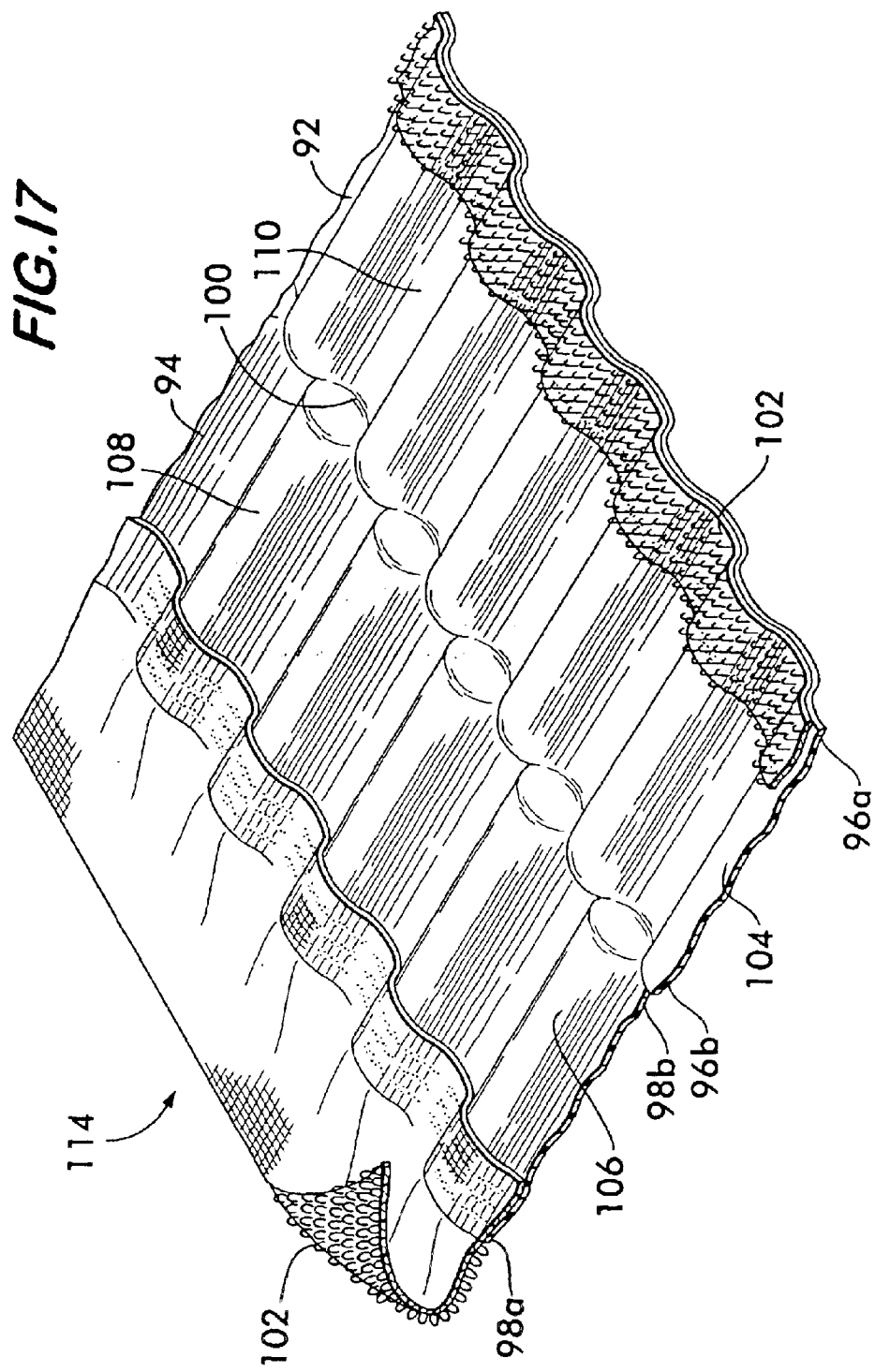

FIGS. 16 and 17 illustrate yet another embodiment 114 of the sheath according to the invention. In this embodiment, hinge 100 comprises a thinned region formed simultaneously with the crests 108 and troughs 110 as described below.

Figure 18:
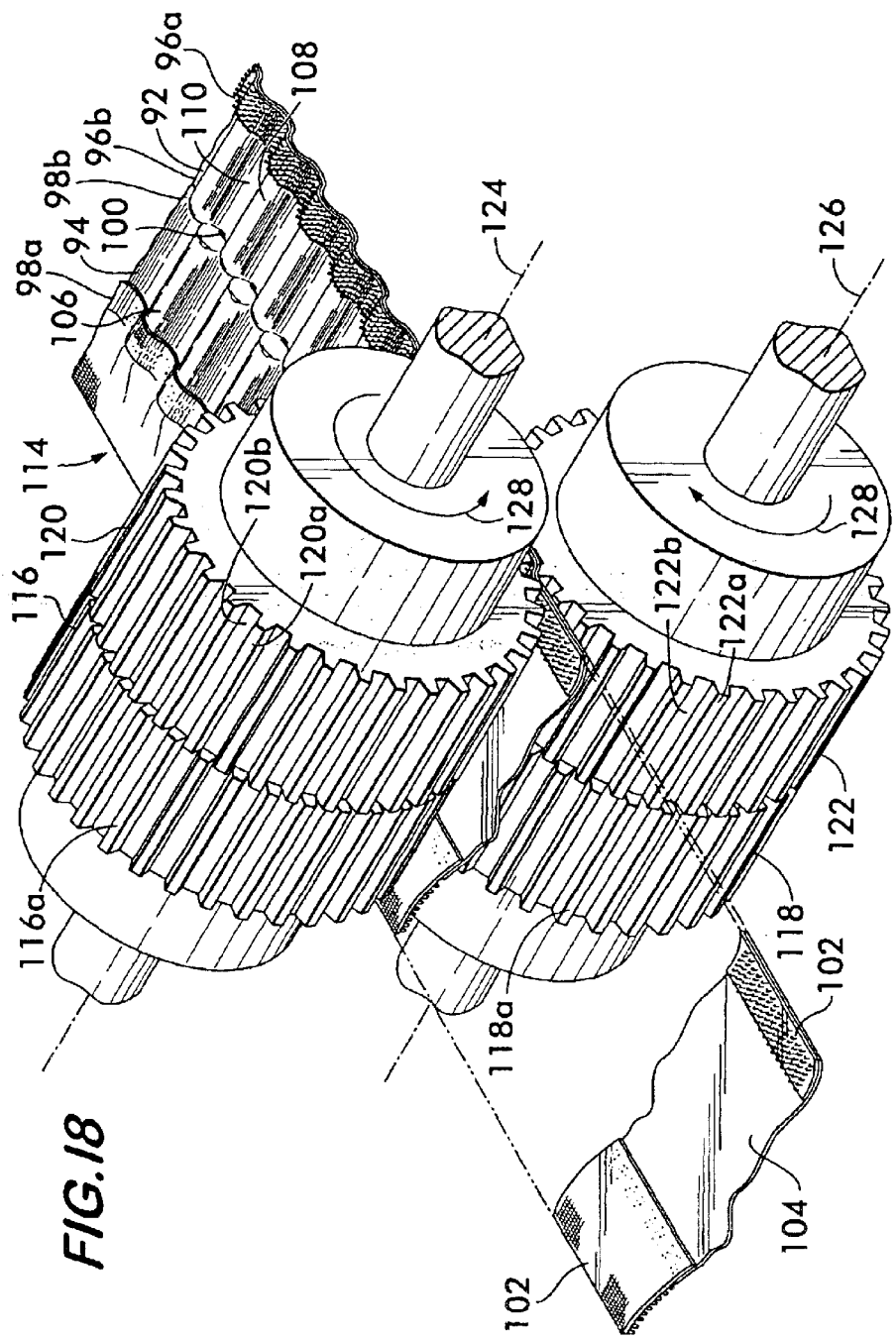
FIG. 18 shows an apparatus and method for manufacturing the sheath shown in FIGS. 16 and 17.

The method of manufacturing sheath 114 is best described with reference to FIG. 18 in which an extruded polymer sheet material 104 is shown having a securing means 102 attached along opposite edges 96a and 98a. Hook and loop securing means are shown by way of example. Sheet material 104 with securing means 102 is then fed between two pairs of intermeshing gears 116, 118, 120 and 122. Gear 116 rotates about axis 124 and meshes with gear 118 which rotates about axis 126, arranged in a substantially parallel spaced relation to axis 124. Gear 120 rotates about axis 124 in fixed relation to gear 116, and gear 122 rotates about axis 126 in fixed relation to gear 118. The gears rotate in the direction shown by arrows 128.

In order to form substrates 92 and 94 with corrugations 106 wherein the crests 108 align with the troughs 110, gear teeth 116a on gear 116 are aligned with the spaces 120b between gear teeth 120a on gear 120. Similarly gear teeth 118a on gear 118 are aligned with the spaces 122b between gear teeth 122a on gear 122. Thus when the sheet material 104 is fed (preferably hot) between the meshing gear pairs 116, 118, 120 and 122 in the unfolded or open position meshing gears 116 and 118 form the corrugations 106 on substrate 94 and meshing gears 120 and 122 form the corrugations 104 on substrate 92. Because of the offset between the gear teeth for gears 116 and 120 and 118 and 122 the crests 108 and troughs 110 on each substrate are offset and able to nest one within the other when the substrates 92 and 94 are folded about the hinge 100. Hinge 100 is formed when the sheet material 104 is thinned by stretching it in the region where the gears 116 and 118 abut gears 120 and 122 respectively. The stretching occurs as a result of the sheet material 104 being forced around and between the offset gear teeth by the meshing gear pairs.

Low-profile protective sheathing according to the invention provides a secure, durable, flexible cover for organizing and protecting elongated items such as wiring, the sheath being economical to produce and readily conformable to various contours as necessary to adapt it to various applications. The conformability of the sheath is augmented by the increased shear flexibility of the hinge being formed from alternating regions of reduce thickness having both in-plane and out of plane orientations yielding a design having more balanced flexibility between the hinged and non-hinged edges of the sheath.

What is claimed is:

1. A sheath for receiving and protecting elongated items, said sheath comprising:
   first and second elongated substrates each having opposite edges defining a width thereof, the edges of one substrate being paired with the edges of the other substrate, one of said pairs of edges being flexibly joined lengthwise of said substrates by a hinge, said hinge being pivotally movable between an open position wherein said first and second substrates are angularly oriented with respect to one another, and a closed position wherein said first and second substrates are overlying one another in substantially parallel relationship;
   said first substrate having corrugations extending transversely of said sheath between said opposite edges of said first substrate;
   said second substrate having corrugations extending transversely of said sheath between said opposite edges of said second substrate;
   said corrugations of said first and second substrates comprising a plurality of crests and troughs arranged one behind another, said crests of said first substrate being substantially aligned with said troughs of said second substrate, thereby permitting said crests on said first substrate to nest within said troughs of said second substrate when said substrates are in said closed position; and
   means for securing said first and second substrates in said closed position mounted along said other pair of edges, the elongated items being receivable between said substrates when in said open position and captured between said substrates when in said closed position.

2. A sheath according to claim 1, wherein said first and second substrates are integrally formed from a single planar sheet of material divided by said hinge, said hinge comprising a plurality of first regions of said sheet having reduced thickness, said first regions of reduced thickness being oriented substantially in the plane of said sheet, and a plurality of second regions of said sheet having reduced thickness, said second regions of reduced thickness being oriented substantially perpendicularly to the plane of said sheet and being connected to said first and second substrates by respective connecting portions of said sheet, each said connecting portion being bent through a substantially right angle, one of said connecting portions being positioned on either side of each of said second regions of reduced thickness, said first and second regions being positioned one behind another in an alternating pattern lengthwise along said substrates.

3. A sheath according to claim 1, wherein said first and second substrates are integrally formed from a single sheet of material, said hinge comprising a region of said sheet of reduced thickness positioned between and thereby defining one of said edges of said first and second substrates.

4. A sheath according to claim 1, wherein said securing means comprises a plurality of hooks positioned along said other edge of said first substrate and a plurality of loops positioned along said other edge of said second substrate, said hooks being engageable with said loops when said substrates are in said closed position to hold said substrates in said closed position.

5. A sheath according to claim 1, wherein said elongated items comprise electrical wires.

6. A sheath for receiving and protecting elongated items, said sheath comprising:
   first and second elongated substrates integrally formed from a single planar sheet of material, each said substrate having opposite edges defining a width thereof, the edges of one substrate being paired with the edges of the other substrate; and
   a hinge flexibly joining one of said pairs of edges lengthwise of said substrates, said hinge being pivotally movable between an open position wherein said first and second substrates are angularly oriented with respect to one another, and a closed position wherein said first and second substrates are overlying one another in substantially parallel relationship, said hinge comprising a plurality of first regions of said sheet having reduced thickness, said first regions of reduced thickness being oriented substantially in the plane of said sheet, and a plurality of second regions of said sheet having reduced thickness, said second regions of reduced thickness being oriented substantially perpendicularly to the plane of said sheet and being connected to said first and second substrates by respective connecting portions of said sheet, each of said connecting portions being bent through a substantially right angle, one of said connecting portions being positioned on either side of each of said second regions of reduced thickness, said first and second regions being positioned one behind another in an alternating pattern lengthwise along said substrates.

7. A sheath according to claim 6 further comprising means for securing said first and second substrates in said closed position mounted along said other pair of edges, the elongated items being receivable between said substrates when in said open position and captured between said substrates when in said closed position.

8. A sheath according to claim 7, wherein said first and second substrates have corrugations extending transversely of said sheath between said opposite edges of said substrates.

9. A sheath according to claim 8, wherein said corrugations comprise a plurality of crests and troughs arranged one behind another, said crests of said first substrate being substantially aligned with said troughs of said second substrate, thereby permitting said crests on said first substrate to nest within said troughs of said second substrate when said substrates are in said closed position.

10. A sheath for receiving and protecting elongated items, said sheath comprising:

first and second elongated substrates integrally formed from a single planar sheet of material, each said substrate having opposite edges defining a width thereof, the edges of one substrate being paired with the edges of the other substrate, said first and second substrates having corrugations extending transversely of said sheath between said opposite edges of said substrates;

said corrugations comprising a plurality of crests and troughs arranged one behind another, said crests of said first substrate being substantially aligned with said troughs of said second substrate, thereby permitting said crests on said first substrate to nest within said troughs of said second substrate when said substrates are in said closed position; and a hinge flexibly joining one of said pairs of edges lengthwise of said substrates, said substrates being pivotally movable about said hinge between an open position wherein said first and second substrates are angularly oriented with respect to one another, and a closed position wherein said first and second substrates are overlying one another in substantially parallel relationship, said hinge comprising a portion of said planar sheet of material positioned between said substrates and having a thickness less than that of said substrates.

11. A sheath according to claim 10 further comprising means for securing said first and second substrates in said closed position mounted along said other pair of edges, the elongated items being receivable between said substrates when in said open position and captured between said substrates when in said closed position.

12. A sheath according to claim 11, wherein said securing means comprises a plurality of hooks positioned along said other edge of said first substrate and a plurality of loops positioned along said other edge of said second substrate, said hooks being engageable with said loops when said substrates are in said closed position to hold said substrates in said closed position.

13. A sheath according to claim 10, wherein said sheet material comprises a thermoplastic.

14. A sheath according to claim 10, said elongated items comprise electrical wires.

* * * * *